Figure 1:
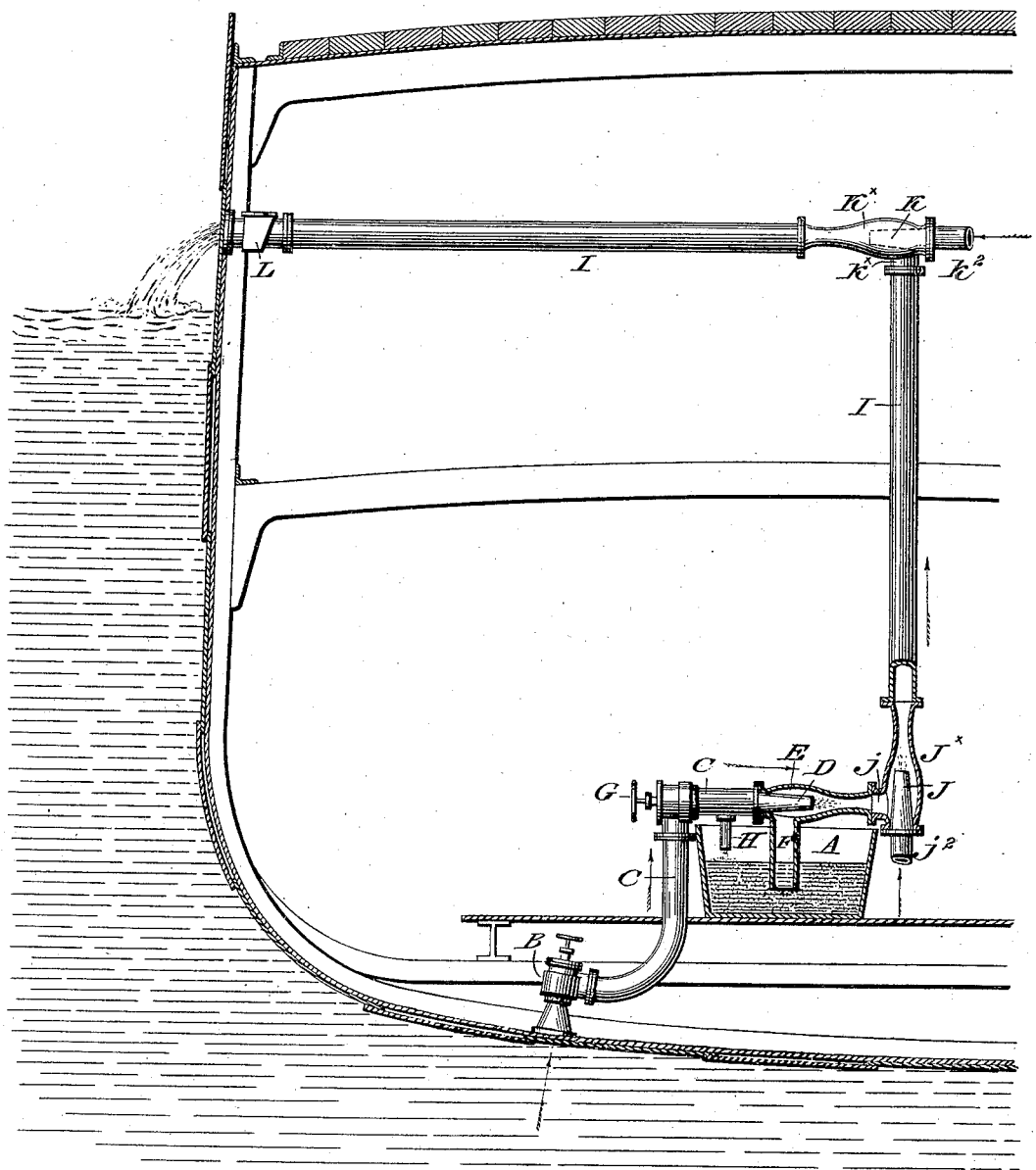

(No Model.)

3 Sheets—Sheet 1.

H. SEE.
DEVICE FOR ELEVATING WATER, ASHES, &c. FROM SHIPS.

No. 368,691.   Patented Aug. 23, 1887.

WITNESSES:
P. H. Nagle.
John Solley Jr.

INVENTOR
Horace See,
By his Attorneys,
Wm. C. Strawbridge
J. Bonsall Taylor

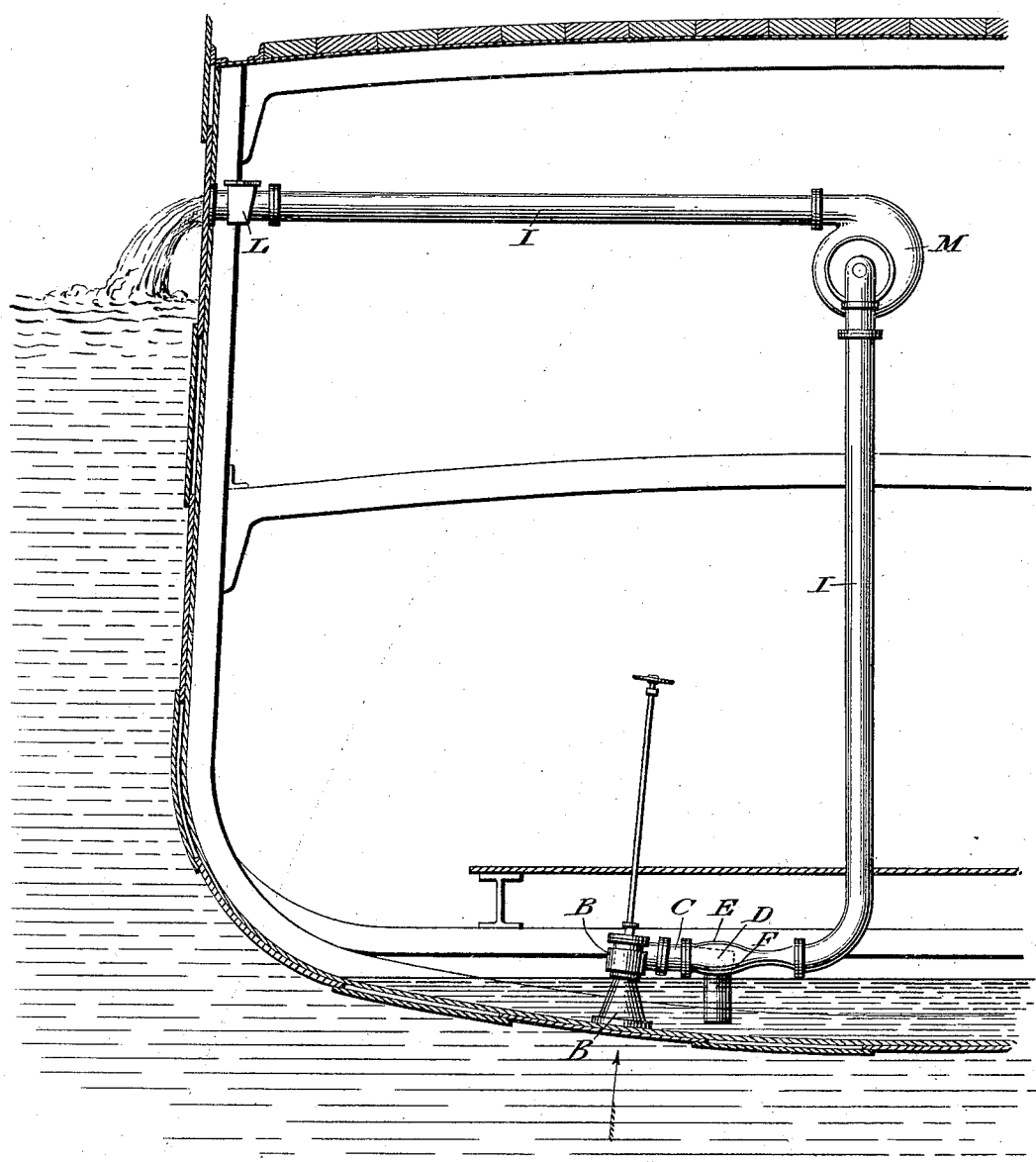

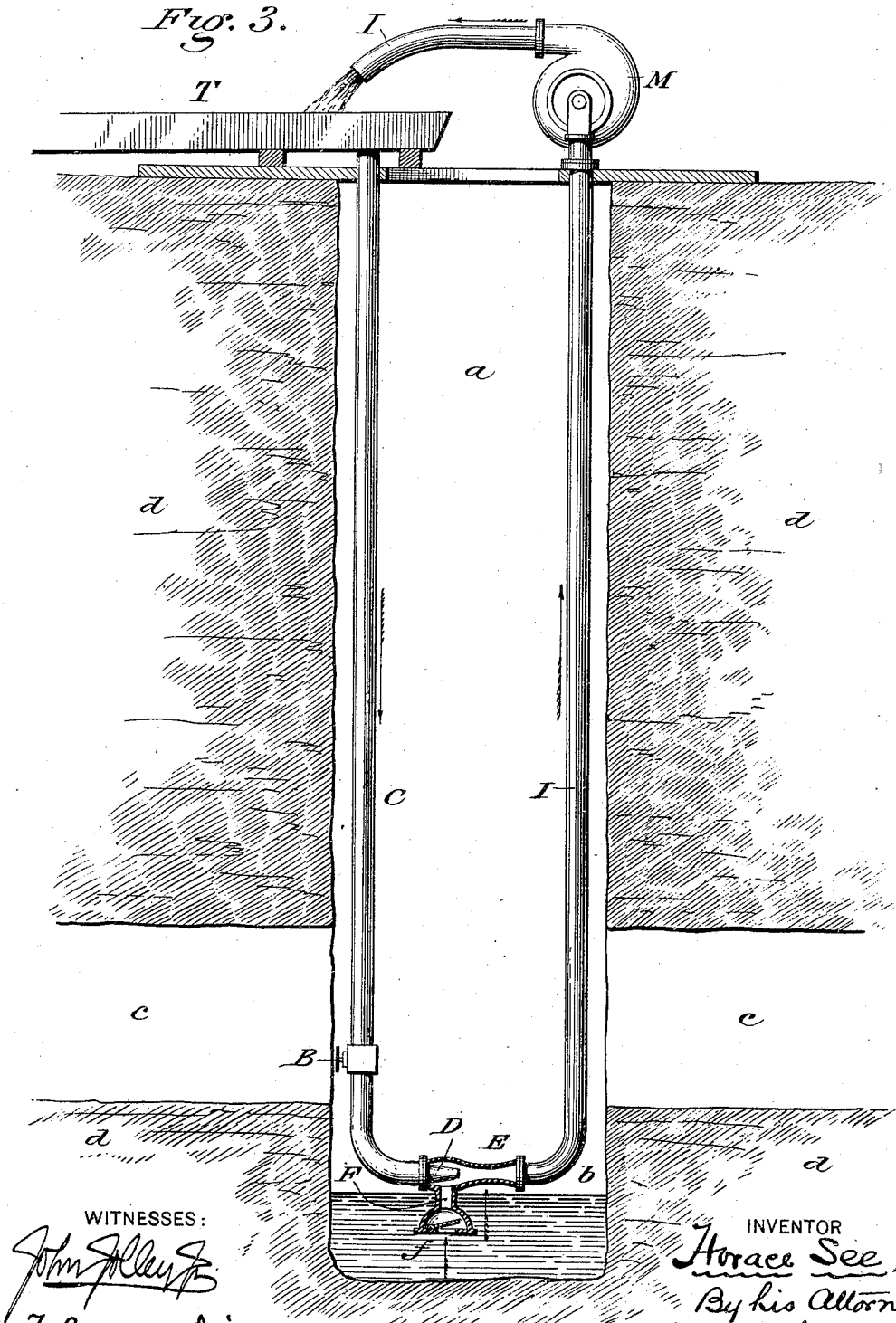

UNITED STATES PATENT OFFICE.

HORACE SEE, OF PHILADELPHIA, PENNSYLVANIA.

DEVICE FOR ELEVATING WATER, ASHES, &c., FROM SHIPS.

SPECIFICATION forming part of Letters Patent No. 368,691, dated August 23, 1887.

Application filed March 3, 1887. Serial No. 229,659. (No model.)

*To all whom it may concern:*

Be it known that I, HORACE SEE, a citizen of the United States, residing in the city and county of Philadelphia, in the State of Pennsylvania, have invented certain Improvements in Devices for Elevating Ashes or Pumping Bilge Water from Ships, and for clearing mines, cellars, etc., of water, of which the following is a specification.

Heretofore, especially in vessels of deep draft, the removal of ashes especially, and, measurably, of bilge water, has been, with devices in common use, expensive, laborious, noisy and dirty. The ordinary modes of clearing mine shafts, cellars, etc. of water have also been expensive and tedious.

My invention aims to effect the removal of ashes, bilge water, and other refuse matter common in ships, by means mechanically simple, inexpensive, quick, clean, and quiet.

Apparatus embodying my invention is represented in the accompanying drawings and described in this specification, the particular subject matter claimed as novel being hereinafter definitely specified.

In the accompanying drawings, Figure 1 is a transverse, sectional, elevation of so much of the frame work of a ship as is necessary to illustrate the application of my improved pump or hoist as employed for the discharge of ashes. Fig. 2 is a similar view representing my invention as applied to the removal of bilge water. Fig. 3 is a sectional view of the sump of a mine shaft, representing my invention as applied to clearing it of water.

Similar letters of reference indicate corresponding parts.

The controlling idea of my invention is to utilize the weight of a column of water, being either one which is artificially erected, or one, so to speak, in which the vessel floats, to effect the raising or elevation of the substance to be discharged. I effect this utilization, so far as ships are concerned, by the employment of the following devices contained within the ship itself.

Referring first to Fig. 1, A is a trough or tank, in which ashes are deposited. B is a sea valve of any preferred character applied to the ship's bottom. C is an inlet pipe leading from the sea valve and terminating, in the form of apparatus under discussion, in an ejector or ejecting nozzle D contained in a suction chamber E, provided with a suction nozzle F opening in the tank which contains the ashes. The inlet pipe C is conveniently provided with a regulating valve G and with a supply nozzle H for supplying sea water to the ashes to render them practically fluid. I is a discharge, outlet, or ejection pipe leading from the suction chamber E upward and thence outward through the ship's side at a point at or above the water line. This discharge pipe, in the form of apparatus represented, is provided with two ejectors or ejecting nozzles the lower of which I designate as J and the upper as K, which are respectively contained in suction chambers $J^\times$ and $K^\times$, which chambers are, both in fact and in effect, continuations or continuing portions of the outlet pipe proper. The suction chamber $J^\times$ is provided with a suction pipe $j$ being the discharge opening from the suction chamber E, while the suction chamber $K^\times$ is provided with a suction pipe $k^\times$ being a continuation of the discharge outlet of the suction chamber $J^\times$. $j^2$ is a pipe leading into the suction chamber $J^\times$ the termination of which pipe is the lower ejecting nozzle J, and $k^2$ is a pipe leading into the suction chamber $K^\times$ the termination of which pipe is the upper ejecting nozzle $J^\times$. These injection pipes $j^2$ and $k^2$ are in direct communication with a steam pump, with an air compressor, or with some other suitable device, not shown in the drawings, for supplying steam, gas, air, or other liquid or fluid. L is an out-board delivery valve of any preferred construction, applied to the discharge or outlet pipe I at the point of its opening through the ship's side.

Such being a description of one embodiment of my invention, it is proper to remark that, while I always intend to employ one starting jet such, for instance, as the ejector J, or, in its place, a reciprocating, centrifugal or other preferred form of pump, as hereinafter described in connection with my bilge water apparatus, I prefer to employ an ejecting jet at every bend in the outlet or discharge pipe, with the object of preventing dead ends at these points.

The operation of the foregoing device is as follows: The sea valve being closed, the ejectors J and K are started, in order to rarify the air in their chambers. The sea valve is then opened and the regulating valve G set. The sea water admitted through the sea valve runs through the ejector nozzle D with a velocity due to the pressure of the water in which the ship floats and to the rarified condition of the air inside the suction chambers J$^\times$ and K$^\times$. A part of the inflowing sea water escaping through the nozzle H liquifies the ashes in the tank, so that they will readily flow through the suction nozzle F to the ejecting nozzle D, and be in a condition to be forced by the atmospheric pressure through said suction nozzle F into the suction chamber E, wherein they will be met by the discharge from the ejecting nozzle D and carried to the ejector J, thence to the ejector J$^\times$, and thence through the delivery valve overboard.

In Fig. 2 which represents another embodiment of my invention adapted for the special purpose of ejecting bilge water, I employ a sea valve B, the inlet pipe C from which terminates in an ejecting nozzle D opening within a suction chamber E which is provided with a suction nozzle F opening just above the bilge, for sucking up the bilge water. The suction chamber E discharges through an outlet or discharge pipe I opening through the ship's side at or above the water level, and provided at such point with an outboard delivery valve L, and also provided, conveniently upon the level of its discharge, with a centrifugal pump M which performs the functions of a starting jet. This apparatus, with the exception of the omission of the ash trough and the nozzle for supplying water to the ashes, neither of which of course is necessary, is essentially the same as that represented in Fig. 1, and, instead of the pump M I can, in its place, employ one or both of the ejectors J and J$^\times$, for which devices the pump M in either mode of application is simply a substitute or equivalent.

The advantages of my invention as applied to ships are apparent: The devices which embody it are practically automatic, or at least require the employment of less manual labor than is required by any contrivance for a similar purpose of which I have knowledge, while the fact that they permit the discharge of ashes at or above the water line prevents the scouring of the vessel by ashes forced against its sides by the current next to the vessel as is always the case when the discharge is below the water level. Increased depth or draft is, moreover, an advantage instead of a disadvantage as heretofore, because the greater the height of the column of water above the sea valve, the greater is the pressure available for the purposes of discharge.

I am aware that a jet from a steam pump introduced near the base of a discharge pipe projecting into a trough containing ashes rendered fluid by admixture with water, has been, aided by atmospheric pressure upon the ashes employed to discharge the latter, but such operation has been uncertain and defective in that it has required an amount of steam or other power obtained only at the expense of large coal consumption.

By my employment of an auxiliary or secondary jet of water, so to speak, entering through a sea valve, the necessary ejecting pressure to be obtained from my starting ejectors or starting pump is reduced, while, as stated, the pressure of my sea water jet becomes the potent pressure, and is in proportion to the height of the column of water outside the vessel, so that increased draught of water instead of augmenting the work to be performed, reduces it.

The ejectors J and J$^\times$, or such other pumps or ejectors as are employed at the bends of the discharge pipe, or a pump of any kind applied near the level of discharge, are therefore in my apparatus, instead of the discharge contrivances proper, simply starting jets or devices, the sea water jet, or the jet of the column of water, being the vital device and one serving to relieve the auxiliary pump or air compressor happening to be employed, of much of its work.

The gist of the contrivance therefore, so far as its application to ships is concerned, resides in the utilization in connection with a starting jet of steam, air, or water, supplied by a pump, air compressor, or kindred contrivance, of an elevating jet of sea water supplied through a sea valve, or other suitable inlet below the water line, and preferably in or adjacent to the ship's bottom, the pressure of which jet is proportionate to the depth of draught of the ship, and which, by a suitable suction nozzle sucks up ashes, bilge-water, or other refuse to effect discharge of the same above the water level.

In Fig. 3, which represents a modification adapted for the special purpose of clearing mines of water,—and in which $a$ represents a main shaft, $b$ a sump at the bottom of said shaft, $c$ a gang-way or other passage running at an angle to the shaft, and $d$ the earth in which the shaft, sump, and gang-way, are channelled,—the column of water which I utilize as the lifting jet is an artificial standing column contained within a stand pipe C vertically erected within the gang-way, provided with a regulating valve B, and terminating in an ejecting nozzle D contained within a suction chamber E within the sump or other apartment or excavation to be cleared of water, which chamber is provided with a suction nozzle F conveniently equipped with a foot valve $f$.

The suction chamber is continued on as an outlet, discharge, or ejection pipe I, which is carried upward to the level of discharge, and, at or about such level, provided with a centrifugal pump M, or with a pump of any other preferred construction, or with an ejecting jet,—the office of any one of which contrivances is to rarify the air and otherwise, as already explained, subserve the purposes of a starting jet. The discharge pipe continues beyond the pump and discharges the elevated water into a tank T, from which it is preferable that the stand pipe should lead out so that some of the water elevated from the sump can be utilized to form the standing column.

The tank is freed from the surplus water in any preferred manner. The operation of this contrivance, which, as is apparent, is readily applicable to any compartment or excavation which it is desired to clear of water, is practically identical with the operation of those embodiments of my invention which are represented in Figs. 1 and 2, and described in connection with the clearance of ships from bilge water or ashes,—the artificial column in the stand pipe subserving the identical purpose of the natural column of water within which a ship floats. The apparatus represented in Fig. 3 is also applicable for dredging purposes.

Having thus described my invention, I claim:—

1. In an apparatus for clearing ships, of water, ashes, or other refuse matter in a fluid or semi-fluid state, the following elements in combination:—an ejection or discharge pipe provided near its lower or inlet extremity with a suction nozzle for introduction into the matter to be discharged;—a jet applied to said ejection pipe near its suction nozzle, for discharging into said pipe, water from a natural or artificial standing column of water;—and a starting jet applied to said ejection pipe at a point between its suction nozzle and its outlet extremity, for discharging into said pipe, air, water, steam, gas, or other liquid or fluid supplied by suitable means to said jet;—substantially as set forth.

2. In an apparatus for discharging a ship of ashes, bilge water, or other refuse matter in solution, an outlet or discharge pipe at its inner extremity opening into the bilge or into a receptacle for ashes or refuse, at its outer extremity opening over or through the ship's side, and provided with a pump or ejector operative as a starting jet, in combination with a sea water ejector at its inner extremity opening within said outlet pipe and its outer extremity in communication with a sea valve,—whereby the starting jet of air, water, steam, or other liquid or fluid, is supplemented by a jet of sea water the pressure of which is proportionate to the height of the column of water within which the vessel floats, substantially as set forth.

3. The combination, to form a device for discharging ships of bilge-water, ashes, and refuse in solution, of a sea valve applied to the ship, an inlet pipe leading from said valve, terminating in an ejector, and provided with a supplemental supply nozzle,—an outlet or discharge pipe the inner extremity of which is formed into or provided with a suction chamber within which the sea water ejector opens, which is provided with a suction pipe opening within the bilge or a trough for containing ashes or refuse, and the outer extremity of which discharges over or through the ship's side,—and one or more ejectors or pumps applied to said outlet or discharge pipe and in communication with suitable sources of air, steam, water, or other liquid or fluid supply, substantially as and for the purposes set forth.

4. The combination, to form a device for discharging ships of bilge-water, ashes, and refuse in solution, of a sea valve applied to the ship, an inlet pipe leading from said valve, terminating in an ejector, provided with a supplemental supply nozzle, and also provided with a regulating valve,—an outlet or discharge pipe the inner extremity of which is formed into or provided with a suction chamber within which the sea water ejector opens, which is provided with a suction pipe opening within the bilge or a trough for containing ashes or refuse, and the outer extremity of which discharges over or through the ship's side, and which is also provided with an outboard discharge valve,—and one or more ejectors or pumps applied to said discharge pipe and in communication with suitable sources of air, steam, water, or other liquid or fluid supply, substantially as and for the purposes set forth.

In testimony whereof I have hereunto signed my name this 2d day of March, A. D. 1887.

HORACE SEE.

In presence of—
J. BONSALL TAYLOR,
JOHN JOLLEY, Jr.